(12) United States Patent
Shirakawa et al.

(10) Patent No.: US 12,372,894 B2
(45) Date of Patent: Jul. 29, 2025

(54) OPTICAL SCANNING APPARATUS AND IMAGE FORMING APPARATUS

(71) Applicant: CANON KABUSHIKI KAISHA, Tokyo (JP)

(72) Inventors: Chihiro Shirakawa, Shizuoka (JP); Hiroyuki Fukuhara, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/359,102

(22) Filed: Jul. 26, 2023

(65) Prior Publication Data

US 2024/0045355 A1 Feb. 8, 2024

(30) Foreign Application Priority Data

Aug. 5, 2022 (JP) ................................. 2022-125218

(51) Int. Cl.
*G03G 15/04* (2006.01)
*G02B 26/12* (2006.01)

(52) U.S. Cl.
CPC ....... *G03G 15/04036* (2013.01); *G02B 26/12* (2013.01)

(58) Field of Classification Search
CPC ..... G03G 15/04036; G03G 2215/0402; G03G 2221/1636; G03G 15/04072; G03G 2215/0404; G02B 26/12; B41J 2/471
See application file for complete search history.

(56) References Cited

U.S. PATENT DOCUMENTS

| 2006/0086494 | A1 | 4/2006 | Kim | |
|---|---|---|---|---|
| 2009/0323147 | A1* | 12/2009 | Amada | ............ G03G 15/04036 359/205.1 |
| 2010/0091083 | A1 | 4/2010 | Itami | |
| 2010/0124435 | A1* | 5/2010 | Uduki | ....................... B41J 2/471 359/216.1 |
| 2013/0002789 | A1* | 1/2013 | Katayama | ............... G02B 26/12 359/212.1 |
| 2019/0227455 | A1* | 7/2019 | Saito | ................. G03G 15/04036 |
| 2019/0332029 | A1* | 10/2019 | Fukuhara | ................ G02B 26/12 |
| 2021/0041801 | A1* | 2/2021 | Ohta | ................ G03G 15/04072 |

FOREIGN PATENT DOCUMENTS

| JP | 2014-016646 A | 1/2014 |
|---|---|---|
| JP | 2015-200852 A | 11/2015 |

OTHER PUBLICATIONS

Jan. 2, 2024 European Official Action in European Patent Appln. No. 23189209.2.

* cited by examiner

*Primary Examiner* — Sandra Brase
(74) *Attorney, Agent, or Firm* — Venable LLP

(57) ABSTRACT

An optical scanning apparatus includes a light source, a polygon mirror including a plurality of reflecting surfaces configured to reflect light emitted from the light source, the polygon mirror being configured to be rotated around a rotary shaft, and a casing configured to accommodate the light source and the polygon mirror. The casing defines a first space that accommodates the polygon mirror and a second space that is different from the first space, the casing including a partition wall disposed between the first space and the second space. The second space is disposed further from the rotary shaft than the partition wall in a radial direction orthogonal to an axial direction of the rotary shaft, and is disposed such that the second space overlaps with the first space in the axial direction.

17 Claims, 4 Drawing Sheets

OPTICAL SCANNING APPARATUS AND IMAGE FORMING APPARATUS

BACKGROUND OF THE INVENTION

Field of the Invention

The present invention relates to an optical scanning apparatus that performs optical scanning, and to an image forming apparatus that includes the optical scanning apparatus.

Description of the Related Art

Japanese Patent Application Publication No. 2015-200852 proposes an image forming apparatus that includes an optical scanning apparatus. The optical scanning apparatus deflects a laser beam controlled in accordance with image data, and scans a photosensitive drum with the deflected laser beam. In recent years, image forming apparatuses have been required to have higher printing speed. A known method for achieving this requirement is to rotate a polygon mirror disposed in the optical scanning apparatus, at a higher speed. However, if the polygon mirror is rotated at a higher speed, the optical scanning apparatus generates heat, so that the casing and optical elements of the optical scanning apparatus are thermally deformed. As a result, the print precision will deteriorate.

For this reason, in the optical scanning apparatus described in Japanese Patent Application Publication No. 2015-200852, a motor and a board for driving the polygon mirror are cooled by using a heatsink. In an optical scanning apparatus described in Japanese Patent Application Publication No. 2014-016646, a box is disposed above a casing that accommodates a polygon mirror, and the box communicates with the casing through a communicating pipe. The box is kept airtight, and the interior of the casing is cooled by the convection of the air contained in the casing and the box.

However, in the optical scanning apparatus described in Japanese Patent Application Publication No. 2015-200852, since the heatsink is additionally disposed in the optical scanning apparatus, the cost will be increased. In addition, in the optical scanning apparatus described in Japanese Patent Application Publication No. 2014-016646, since the box is disposed above the casing for exchanging heat with the casing of the optical scanning apparatus, the size of the optical scanning apparatus will be increased in the axial direction of the polygon mirror.

SUMMARY OF THE INVENTION

According to one aspect of the present invention, an optical scanning apparatus includes a light source, a polygon mirror including a plurality of reflecting surfaces configured to reflect light emitted from the light source, the polygon mirror being configured to be rotated around a rotary shaft, and a casing configured to accommodate the light source and the polygon mirror. The casing defines a first space that accommodates the polygon mirror and a second space that is different from the first space, the casing including a partition wall disposed between the first space and the second space. The second space is disposed further from the rotary shaft than the partition wall in a radial direction orthogonal to an axial direction of the rotary shaft, and is disposed such that the second space overlaps with the first space in the axial direction.

Further features of the present invention will become apparent from the following description of exemplary embodiments with reference to the attached drawings.

DESCRIPTION OF THE EMBODIMENTS

Overall Configuration

Figure 1:
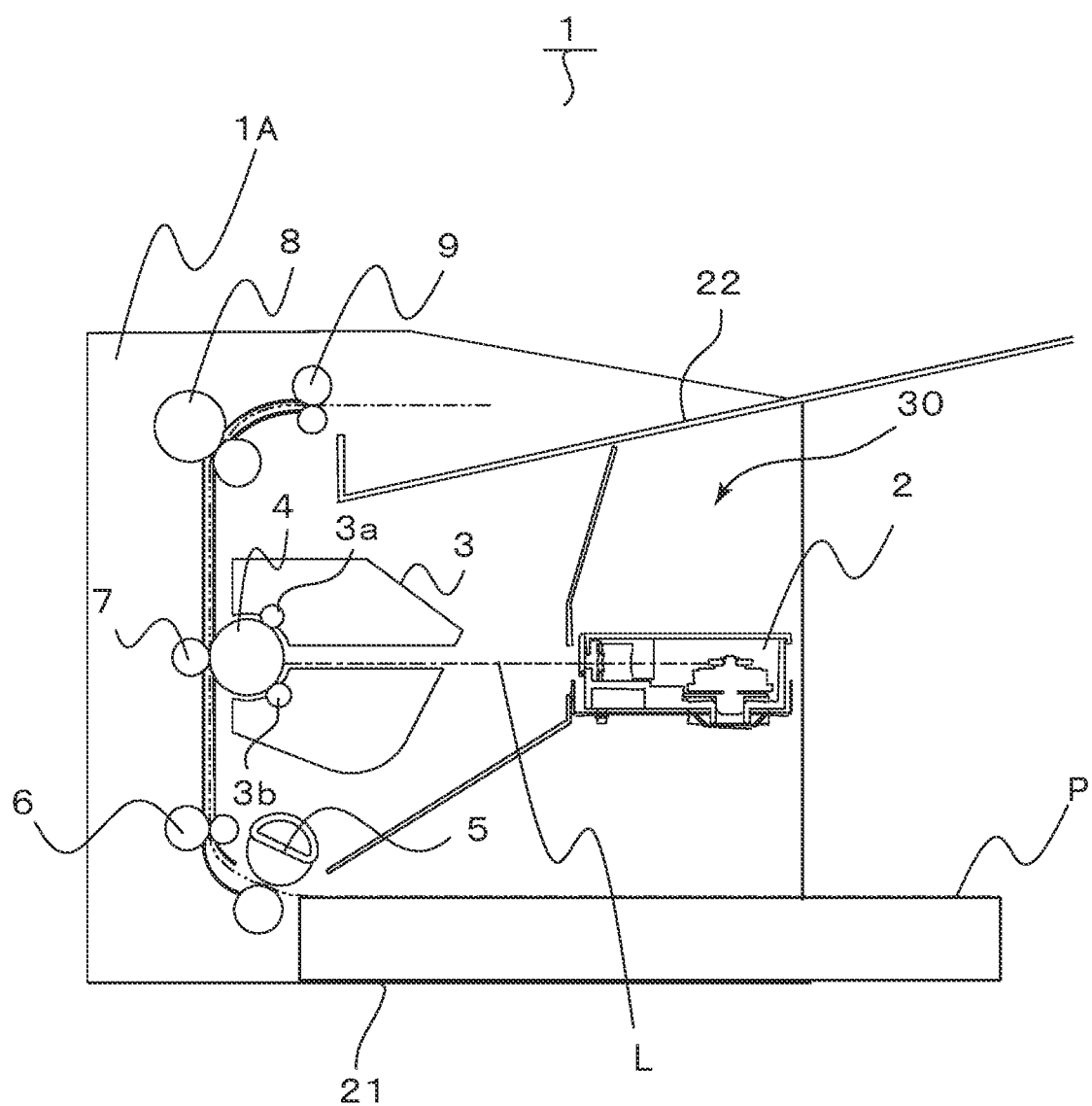
FIG. 1 is an overall schematic diagram illustrating a printer of the present embodiment.

A printer 1 of the present embodiment, which serves as an image forming apparatus, is an electrophotographic laser-beam printer. As illustrated in FIG. 1, the printer 1 includes a sheet stacking portion 21, an image forming portion 30, a fixing apparatus 8, and a discharging roller pair 9. The sheet stacking portion 21 is disposed in a lower portion of a printer body 1A, and the image forming portion 30 forms an image on a sheet P fed from the sheet stacking portion 21.

When an image forming instruction is sent to the printer 1, the image forming portion 30 starts an image forming process in accordance with image information sent from, for example, an external computer connected to the printer 1. The image forming portion 30 includes a process cartridge 3, an optical scanning apparatus 2, and a transfer roller 7. The process cartridge 3 includes a photosensitive drum 4 that serves as an image bearing member, a charging roller 3a, and a developing roller 3b. The optical scanning apparatus 2 emits a laser beam L toward the photosensitive drum 4, in accordance with the image information sent from the external computer. The photosensitive drum 4 is charged in advance by the charging roller 3a. Thus, by the laser beam L emitted to the photosensitive drum 4, an electrostatic latent image is formed on the photosensitive drum 4. After that, the electrostatic latent image is developed by the developing roller 3b, so that a toner image is formed on the photosensitive drum 4.

In parallel with the above-described image forming process, a sheet P stacked on the sheet stacking portion 21 is fed by a feeding roller 5. Note that the sheet P is separated from other sheets, one by one, by a separation portion (not illustrated). The sheet P is then conveyed by an intermediate conveyance roller pair 6, toward the transfer roller 7. The transfer roller 7 is applied with transfer bias, and transfers the toner image formed on the photosensitive drum 4, onto the sheet P.

The sheet P onto which the toner image has been transferred by the transfer roller 7 is heated and pressed by the fixing apparatus 8, so that the toner image is fixed to the sheet P The sheet P is then discharged to a discharging tray 22 by the discharging roller pair 9.

In the present embodiment, the process cartridge 3 includes the photosensitive drum 4, the charging roller 3a, and the developing roller 3b. However, the present disclosure is not limited to this. For example, the process cartridge 3 may include a drum cartridge that includes the photosensitive drum 4 and the charging roller 3a, and a developing cartridge that includes the developing roller 3b. In this case, the developing cartridge is detachably attached to the drum cartridge. The sheet may be a paper sheet, such as a sheet for any purpose or an envelope, a plastic film such as an overhead projector (OHP) sheet, or a cloth sheet.

Optical Scanning Apparatus

Figure 2:
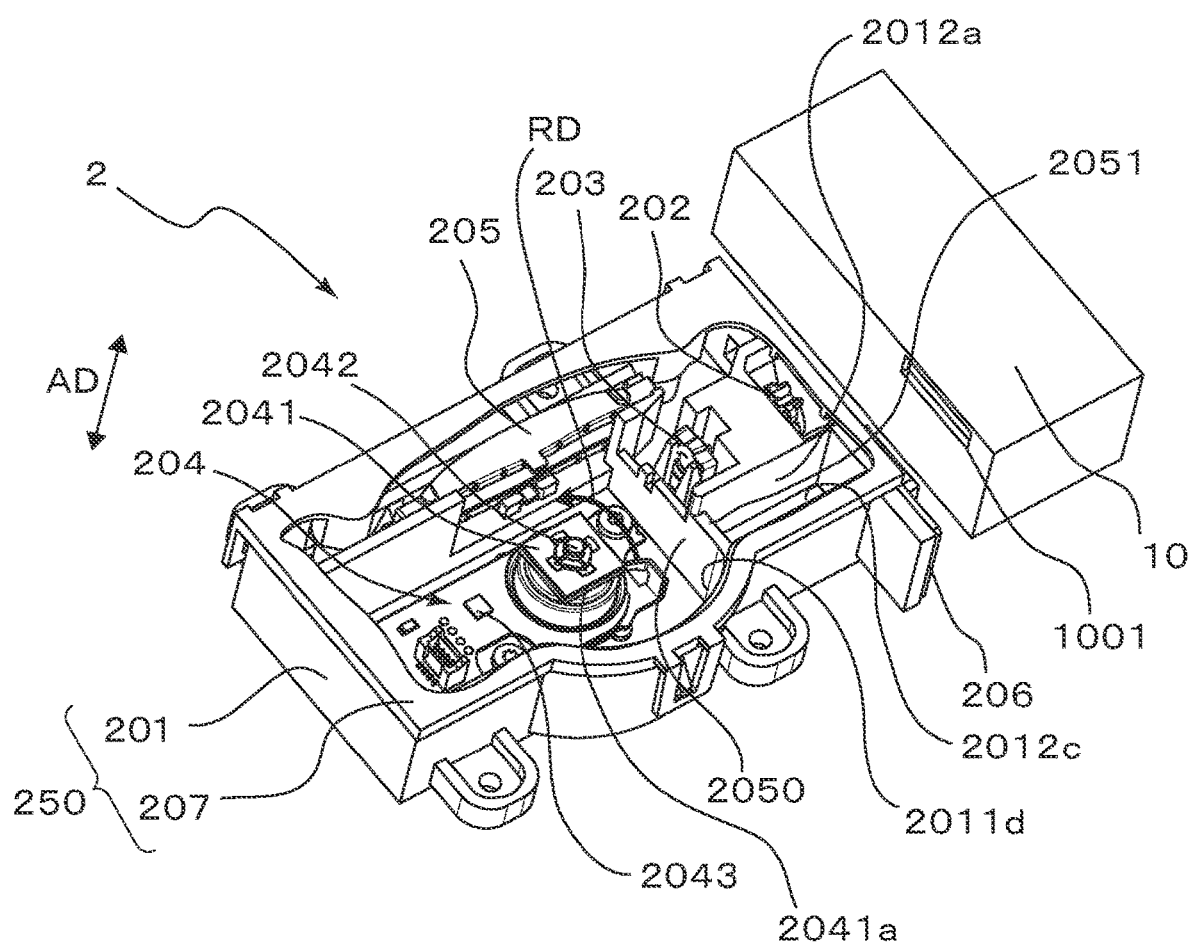
FIG. 2 is a perspective view illustrating an optical scanning apparatus and an air duct.
Figure 3A:
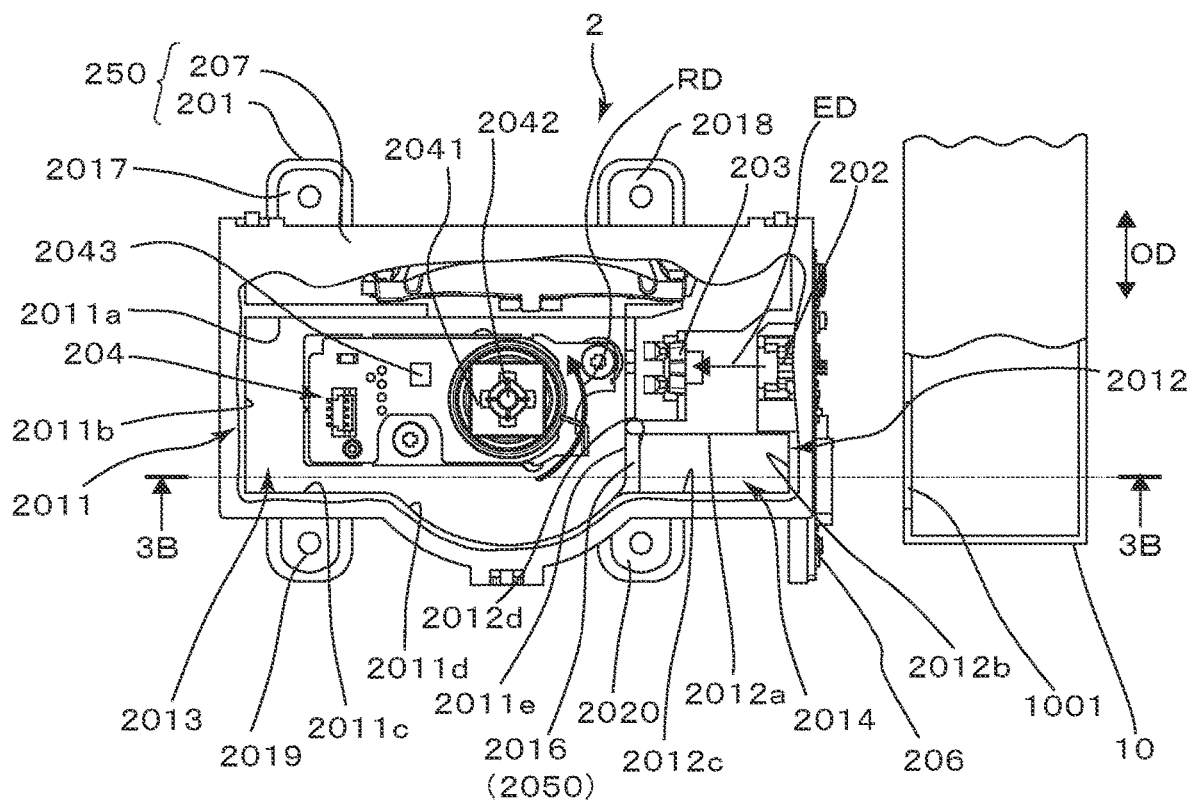
FIG. 3A is a plan view illustrating the optical scanning apparatus and the air duct.
Figure 3B:
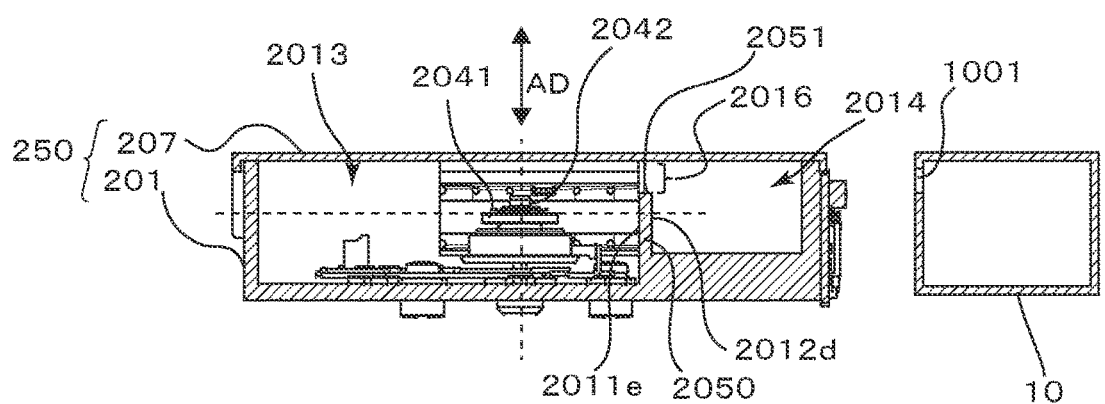
FIG. 3B is a cross-sectional view taken along a 3B-3B line of FIG. 3A.

Next, a configuration of the optical scanning apparatus 2 will be described with reference to FIGS. 2 to 3B. FIG. 2 is a perspective view illustrating the optical scanning apparatus 2 and an air duct 10. FIG. 3A is a plan view illustrating the optical scanning apparatus 2 and the air duct 10. FIG. 3B is a cross-sectional view taken along a 3B-3B line of FIG. 3A. Note that in FIGS. 2 and 3A, part of a cover portion 207 is cut out for illustrating the interior of a casing 250 of the optical scanning apparatus 2. In practice, however, the optical scanning apparatus 2 is sealed by the casing 250.

As illustrated in FIG. 2, the optical scanning apparatus 2 includes a laser light-source unit 202 that serves as a light source, an image forming lens 203 that serves as an optical element, a light deflector 204, a scanning lens 205, the casing 250, and a laser board 206. The laser light-source unit 202, the image forming lens 203, the light deflector 204, and the scanning lens 205 are accommodated in the casing 250, and supported by a base portion 201 of the casing 250. The casing 250 includes the base portion 201 and the cover portion 207. The base portion 201 is formed like a box, and one portion of the base portion 201 is opened. The cover portion 207 covers the opening portion of the base portion 201.

The laser board 206 is supported by the base portion 201 in the outside of the casing 250. The light deflector 204 includes a polygon mirror 2041, a driving portion (not illustrated), and an integrated circuit 2043. The polygon mirror 2041 is supported by a rotary shaft 2042 such that the polygon mirror 2041 can rotate around the rotary shaft 2042. The driving portion includes a motor that rotates the polygon mirror 2041. The integrated circuit 2043 controls the driving portion. The polygon mirror 2041 includes a plurality of reflecting surfaces 2041a configured to reflect light emitted from the laser light-source unit 202.

The laser board 206 causes the laser light-source unit 202 to emit a laser beam in accordance with the image information sent from the external computer. The laser beam emitted from the laser light-source unit 202 is imaged on the polygon mirror 2041 of the light deflector 204 by the image forming lens 203. The polygon mirror 2041 is rotated on the rotary shaft 2042 in a direction indicated by an arrow RD in FIGS. 2 and 3A, by the driving portion (not illustrated). With this rotation, the laser beam is deflected by the polygon mirror 2041, and the photosensitive drum 4 is scanned with the deflected laser beam by the polygon mirror 2041. The laser beam passes through the scanning lens 205, and forms an electrostatic latent image on the photosensitive drum 4 (see FIG. 1).

As illustrated in FIG. 3A, the base portion 201 of the optical scanning apparatus 2 includes four fixing portions 2017, 2018, 2019, and 2020. The four fixing portions 2017, 2018, 2019, and 2020 are fixed to the frame of the printer body 1A (see FIG. 1) of the printer 1, via screws. The air duct 10 is disposed in the vicinity of the optical scanning apparatus 2 of the printer 1, and forms a wind channel through which cooling wind is conveyed to the optical scanning apparatus 2. The cooling wind is taken in from the outside of the printer 1 by an air blowing fan (not illustrated). The air that has passed through the air duct 10 is emitted from an air outlet 1001 disposed in the air duct 10, to the optical scanning apparatus 2.

Next, a configuration of the base portion 201 of the optical scanning apparatus 2 will be described with reference to FIGS. 3A and 3B. The base portion 201 includes a first wall-surface group 2011 and a second wall-surface group 2012. The first wall-surface group 2011 surrounds the light deflector 204, and the second wall-surface group 2012 is formed continuously with the first wall-surface group 2011 via a partition wall 2050. The first wall-surface group 2011 includes wall surfaces 2011a, 2011b, 2011c, 2011d, and 2011e; and defines a first space 2013. That is, the light deflector 204 is accommodated in the first space 2013.

The second wall-surface group 2012 includes wall surfaces 2012a, 2012b, 2012c, and 2012d; and defines a second space 2014 that is different from the first space 2013. The partition wall 2050 is disposed between the first space 2013 and the second space 2014, and defines a communicating space 2016 that causes the first space 2013 and the second space 2014 to communicate with each other. The partition wall 2050 includes the wall surface 2011e, which is a portion of the wall surfaces that define the first space 2013, and the wall surface 2012d, which is disposed opposite to the wall surface 2011e and is a portion of the wall surfaces that define the second space 2014. In the second space 2014, optical elements, such as the laser light-source unit 202, and the image forming lens 203, are not disposed.

The second space 2014 is disposed further from the rotary shaft 2042 of the polygon mirror 2041 than the partition wall 2050 in a radial direction orthogonal to an axial direction AD of the rotary shaft 2042, and is disposed such that the second space 2014 overlaps with the first space 2013 in the axial direction AD. In addition, the second space 2014 overlaps with the laser light-source unit 202 and the image forming lens 203 in a laser emission direction ED of the laser light-source unit 202. In addition, the second space 2014 is arranged to be shifted from the laser light-source unit 202 and the image forming lens 203 in an orthogonal direction OD orthogonal to the emission direction ED and the axial direction AD. In addition, the second space 2014 is disposed between the communicating space 2016 and the laser board 206 in the emission direction ED. In other words, the second space 2014 is disposed between the partition wall 2050 and the laser board 206 in the emission direction ED. The first space 2013 is arranged to be shifted from the laser light-source unit 202, the image forming lens 203, and the second space 2014 in the emission direction ED. That is, the second space 2014 is provided in a dead space surrounded by the laser board 206, the laser light-source unit 202, the image forming lens 203, and the fixing portion 2020. Thus, the second space 2014 is defined in the casing 250 so as not to upsize the optical scanning apparatus 2.

In addition, the second space 2014 is disposed downstream of the communicating space 2016 in the direction indicated by the arrow RD, which is the rotational direction of the polygon mirror 2041, and at a position at which the second space 2014 faces the air outlet 1001 disposed in the air duct 10.

The wall surface 2011d, which is a portion of the wall surfaces that defines the first space 2013, projects toward a direction separating from the rotary shaft 2042 more than the wall surface 2011c is in a radial direction orthogonal to the axial direction AD. More specifically, the wall surface 2011d is formed in an arc shape around the rotary shaft 2042, and projects toward a direction in which the wall surface 2011d is separated more from the rotary shaft 2042 than the wall surfaces 2011c and 2012c are. Note that the wall surface 2011c serves as a first surface, extends in the emission direction ED and the axial direction AD, and defines a part of the first space 2013. The wall surface 2011d serves as a second surface, and is formed continuously with the wall surfaces 2011c and 2012c and disposed upstream of the partition wall 2050 in the direction indicated by the arrow RD.

Since the wall surface 2011d is formed an arc shape in this manner, the capacity of the first space 2013 can be increased by using a space between the fixing portions 2019 and 2020. As a result, the temperature rise in the casing 250 can be reduced. In addition, since the wall surface 2011d is formed in an arc shape, it is possible to reduce wind noise caused by the airflow, generated by the polygon mirror 2041, abutting against the wall surface 2011d.

The partition wall 2050 includes an opening portion 2051 formed in an upper portion of the partition wall 2050. As illustrated in FIGS. 2 and 3B, the opening portion 2051 is formed so that the partition wall 2050 becomes lower in height than the wall surfaces 2011d, 2012a, and 2012c in the axial direction AD. The opening portion 2051 is disposed between the first space 2013 and the second space 2014, and defines the communicating space 2016. The communicating space 2016 is disposed above the polygon mirror 2041 and arranged to be shifted from the polygon mirror 2041 in the axial direction AD. Thus, the airflow generated in the vicinity of the polygon mirror 2041 and having high wind velocity mainly collides with the wall surface 2011e of the partition wall 2050 in the first place. Since the airflow collides with the wall surface 2011e, the wind noise caused by the airflow passing through the communicating space 2016 and directly colliding with the wall surface 2012a can be reduced.

Figure 4A:
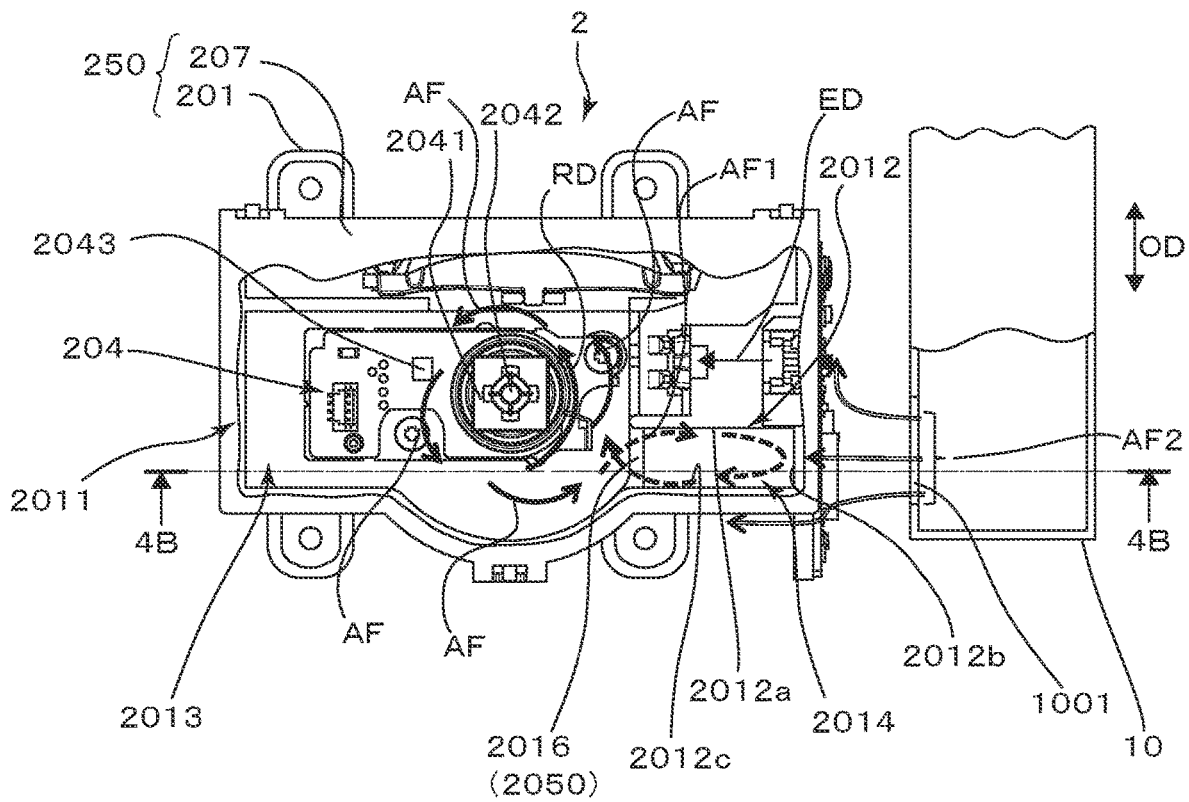
FIG. 4A is a plan view illustrating airflow in the optical scanning apparatus and the air duct.
Figure 4B:
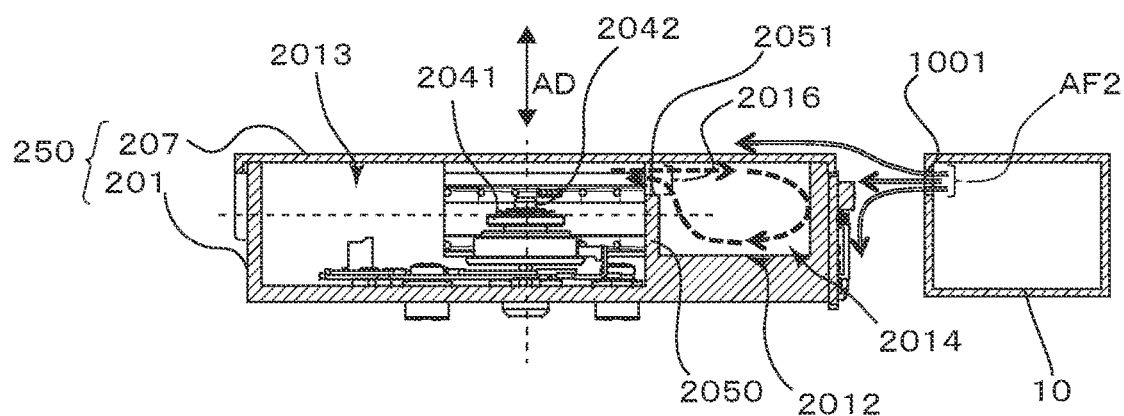
FIG. 4B is a cross-sectional view taken along a 4B-4B line of FIG. 4A.

In the present embodiment, the whole of the communicating space 2016 is arranged to be shifted from the polygon mirror 2041 in the axial direction AD. However, the present disclosure is not limited to this. For example, the communicating space 2016 may be disposed at a position at which at least one portion of the communicating space 2016 is arranged to be shifted from the polygon mirror 2041 in the axial direction AD. In another case, the communicating space 2016 may be disposed at a position at which the whole of the communicating space 2016 overlaps with the polygon mirror 2041 in the axial direction AD. Airflow in Casing of Optical Scanning Apparatus Next, the airflow in the casing 250 of the optical scanning apparatus 2 will be described with reference to FIGS. 4A and 4B. As illustrated in FIGS. 4A and 4B, when the polygon mirror 2041 rotates in a direction indicated by the arrow RD, airflow AF is generated around the polygon mirror 2041 in the casing 250, along the direction indicated by the arrow RD. This is because the polygon mirror 2041 agitates the air contained in the casing 250, in the direction indicated by the arrow RD.

The air is heated by the heat generated by the integrated circuit 2043 and a rotor bearing portion of the light deflector 204, and rides the airflow AF and flows in the casing 250. Part of the air, like airflow AF1, flows from the first space 2013 toward the communicating space 2016. After that, the airflow AF1 flows from the communicating space 2016 into the second space 2014, and convects in the second space 2014, along the cover portion 207 and the wall surfaces 2012a, 2012b, 2012c, and the like of the casing 250.

On the other hand, cooling wind AF2 emitted from the air outlet 1001 of the air duct 10 is blown toward the second space 2014 of the casing 250. That is, the air outlet 1001 is an air blowing portion that blows air toward an outer wall of the casing 250, which defines the second space 2014. The air outlet 1001 is disposed opposite to the first space 2013 with respect to the laser light-source unit 202, the image forming lens 203, and the second space 2014 in the emission direction ED. After the cooling wind AF2 collides with the casing 250, part of the cooling wind AF2 flows on the outer surfaces of the second wall-surface group 2012 and the cover portion 207 that surround the second space 2014.

A portion of the second wall-surface group 2012, which defines the second space 2014, is formed by the outer wall of the casing 250. More specifically, at least the wall surfaces 2012b and 2012c of the second wall-surface group 2012 are formed by the outer wall of the casing 250. Thus, the air in the second space 2014, which is heated by the airflow AF1 that flows from the first space 2013 into the second space 2014, is cooled by the cooling wind AF2 that flows along the outer surface of the casing 250 in a state where the cooling wind AF2 is in contact with the outer surface. Then, the air cooled in the second space 2014 flows out into the first space 2013 through the communicating space 2016. By repeating the above-described cycle, the air heated in the casing 250 can be cooled efficiently, and the temperature rise in the casing 250 can be reduced.

As described above, in the present embodiment, the second space 2014 defined by the second wall-surface group 2012 is provided in a dead space of the casing 250. In addition, the first space 2013, in which the light deflector 204 is disposed, and the second space 2014 communicate with each other via the communicating space 2016, and the first space 2013 and the second space 2014 are disposed at positions at which the first space 2013 and the second space 2014 overlap with each other in the axial direction AD.

Since the casing 250 of the optical scanning apparatus 2 is configured simply in this manner, the increase in cost and size can be prevented. In addition, part of the air heated in the first space 2013, in which the light deflector 204 is disposed, rides the airflow and flows into the second space 2014. Then, the air is cooled in the second space 2014, and returns to the first space 2013. With this operation, the cooling performance of the optical scanning apparatus 2 can be increased. That is, it is possible to provide the optical scanning apparatus 2 whose cooling performance is increased while the increase in cost and size is prevented. Since the cooling performance of the optical scanning apparatus 2 is increased, the print precision on the photosensitive drum 4 is increased, which increases the image quality.

In addition, since the communicating space 2016 is arranged to be shifted from the polygon mirror 2041 in the axial direction AD, the wind noise, caused by the airflow generated by the polygon mirror 2041, can be reduced. A part of the walls that define the second space 2014 is the outer wall of the casing 250, and the cooling wind AF2 from the air duct 10 is blown toward the outer wall. As a result, the air in the second space 2014 can be cooled efficiently. Thus, the cooling performance of the optical scanning apparatus 2 can be increased.

Other Embodiments

In the present embodiment, the polygon mirror 2041 rotates counterclockwise in the rotational direction (indicated by the arrow RD). However, the present disclosure is not limited to this. For example, the polygon mirror 2041 may rotate clockwise. In this case, the same effects as those of the present embodiment can be produced if the second space 2014 is arranged downstream of the communicating space 2016 in the rotational direction of the polygon mirror 2041.

In the present embodiment, the communicating space 2016 is defined by the opening portion 2051 of the partition wall 2050. However, the present disclosure is not limited to this. For example, a through-hole portion may be formed in the partition wall 2050, and the internal space of the through-hole portion may serve as the communicating space 2016.

In the present embodiment, the communicating space 2016 is disposed at a position that is higher than the polygon mirror 2041 in the axial direction AD. However, the present disclosure is not limited to this. For example, the communicating space 2016 may be disposed at a position that is lower than the polygon mirror 2041 in the axial direction AD. That is, the communicating space 2016 has only to be disposed so as not to overlap with the polygon mirror 2041.

In the present embodiment, the optical scanning apparatus 2 is configured such that a portion of the casing 250, especially a portion that defines the second space 2014, is cooled by the cooling wind AF2 from the air duct 10. However, the present disclosure is not limited to this. For example, the cooling wind AF2 may be blown on another portion of the casing 250 or on an area near the casing 250 as long as the second space 2014 can be cooled. In another case, the air duct 10 may not be used, and the airflow generated by a fan may be directly blown on the casing 250. Furthermore, the casing 250 may be cooled not by the cooling wind, but by a heatsink or the like.

In the present embodiment, the laser light-source unit 202 is used as the light source of the optical scanning apparatus 2. However, the present disclosure is not limited to this. For example, another light source, such as an incandescent lamp, a halogen lamp, a fluorescent lamp, or a light emitting diode, may be used.

In the present embodiment, the image forming lens 203 is disposed in the casing 250. However, the present disclosure is not limited to this. For example, the image forming lens 203 may not be disposed, and the light emitted from the laser light-source unit 202 may be reflected by the polygon mirror 2041, without passing through the image forming lens 203.

The present embodiment has been described for the electrophotographic printer 1, but the present invention is not limited to this. For example, the present invention may also be applied to an ink-jet image forming apparatus that forms images on sheets by injecting ink from a nozzle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-125218, filed Aug. 5, 2022, which is hereby incorporated by reference herein in its entirety.

What is claimed is:

1. An optical scanning apparatus comprising:
   a laser-light-source unit configured to emit a laser beam;
   a polygon mirror including a plurality of reflecting surfaces configured to reflect the laser beam emitted from the laser-light-source unit, the polygon mirror being configured to be rotated around a rotary shaft which extends in an axial direction; and
   a casing configured to accommodate the laser-light-source unit and the polygon mirror,
   wherein the casing defines (1) a first space that accommodates the polygon mirror and (2) a second space that is different from the first space, the casing including a partition wall disposed between the first space and the second space, wherein a first space wall portion is configured to define a portion of the first space, and wherein a second space wall portion is configured to be formed continuously with the first space wall portion and to define a portion of the second space,
   wherein the second space overlaps with the first space in the axial direction and aligns in an emission direction with the first space, the emission direction being parallel to a direction in which the laser-light-source unit emits the laser beam,
   wherein the laser-light-source unit overlaps with the polygon mirror when viewed in the emission direction, and aligns in an orthogonal direction with the second space, the orthogonal direction being orthogonal to both of the emission direction and the axial direction,
   wherein the partition wall faces the polygon mirror in the emission direction when viewed in the orthogonal direction, and is provided with an opening portion which defines a communicating space communicating the first space and the second space with each other, and
   wherein the partition wall extends from a boundary between the first space wall portion and the second space wall portion, the partition wall being configured such that the opening portion is continuously located at the boundary.

2. The optical scanning apparatus according to claim 1, wherein the second space is disposed further from the rotary shaft than the partition wall in a radial direction orthogonal to the axial direction.

3. The optical scanning apparatus according to claim 2, wherein the first space wall portion includes (1) a first surface the first space, the first surface extending in both of the emission direction and the axial direction and (2) a second surface projecting toward a direction separating from the rotary shaft in the radial direction more than the first surface, and
   wherein the second surface is disposed downstream of the first surface and is disposed upstream of the partition wall and the laser-light-source unit in a rotational direction of the rotary shaft.

4. The optical scanning apparatus according to claim 3, wherein the second surface is formed in an arc shape around the rotary shaft.

5. The optical scanning apparatus according to claim 3, wherein the second surface is curved.

6. The optical scanning apparatus according to claim 3, wherein the second surface is provided to be adjacent to the partition wall.

7. The optical scanning apparatus according to claim 1, wherein at least a part of walls that define the second space is an outer wall of the casing.

8. The optical scanning apparatus according to claim 1, further comprising an optical element configured to image the laser beam emitted from the laser-light-source unit on the polygon mirror.

9. The optical scanning apparatus according to claim 8, wherein the optical element is not disposed in the second space.

10. The optical scanning apparatus according to claim 8, wherein the second space overlaps with the laser-light-source unit and the optical element in the emission direction, and is arranged to be shifted from the laser-light-source unit and the optical element in the orthogonal direction.

11. The optical scanning apparatus according to claim 10, wherein the partition wall extends in the orthogonal direction, and wherein the first space is shifted from the laser-light-source unit, the optical element, and the second space in the emission direction.

12. An image forming apparatus comprising:

the optical scanning apparatus according to claim 1;

an image bearing member on which an electrostatic latent image is formed by being scanned by the optical scanning apparatus; and an air blowing portion configured to blow air toward an outer wall of the casing, the outer wall being configured to define the second space.

13. The image forming apparatus according to claim 12, wherein the air blowing portion is disposed opposite to the first space with respect to the laser-light-source unit and the second space in the emission direction.

14. The image forming apparatus according to claim 12, wherein the optical scanning apparatus includes a laser board configured to control the laser-light-source unit, and wherein the second space is disposed between the partition wall and the laser board in the emission direction.

15. The optical scanning apparatus according to claim 1, wherein the second space is smaller than the first space.

16. An optical scanning apparatus comprising:

a laser-light-source unit configured to emit a laser beam;

a polygon mirror including a plurality of reflecting surfaces configured to reflect the laser beam emitted from the laser-light-source unit, the polygon mirror being configured to be rotated around a rotary shaft which extends in an axial direction; and a casing configured to accommodate the laser-light-source unit and the polygon mirror, wherein the casing defines (1) a first space that accommodates the polygon mirror and (2) a second space that is different from the first space, the casing including a partition wall disposed between the first space and the second space, wherein a first space wall portion is configured to define a portion of the first space, and wherein a second space wall portion configured to be formed continuously with the first space wall portion and to define a portion of the second space, wherein the second space aligns in an emission direction with the first space, and aligns in an orthogonal direction with the laser-light-source unit, the emission direction being parallel to a direction in which the laser-light-source unit emits the laser beam, the orthogonal direction being orthogonal to both of the emission direction and the axial direction, wherein the partition wall faces the polygon mirror in the emission direction when viewed in the orthogonal direction, and is provided with an opening portion which defines a communicating space communicating the first space and the second space with each other, and wherein the partition wall extends from a boundary between the first space wall portion and the second space wall portion, the partition wall being configured such that the opening portion is continuously located at the boundary.

17. The optical scanning apparatus according to claim 16, wherein the partition wall extends along the orthogonal direction, and is higher than the polygon mirror in the axial direction.

\* \* \* \* \*